(No Model.)
R. M. ATWATER.
GLASS FURNACE.
No. 485,340. Patented Nov. 1, 1892.
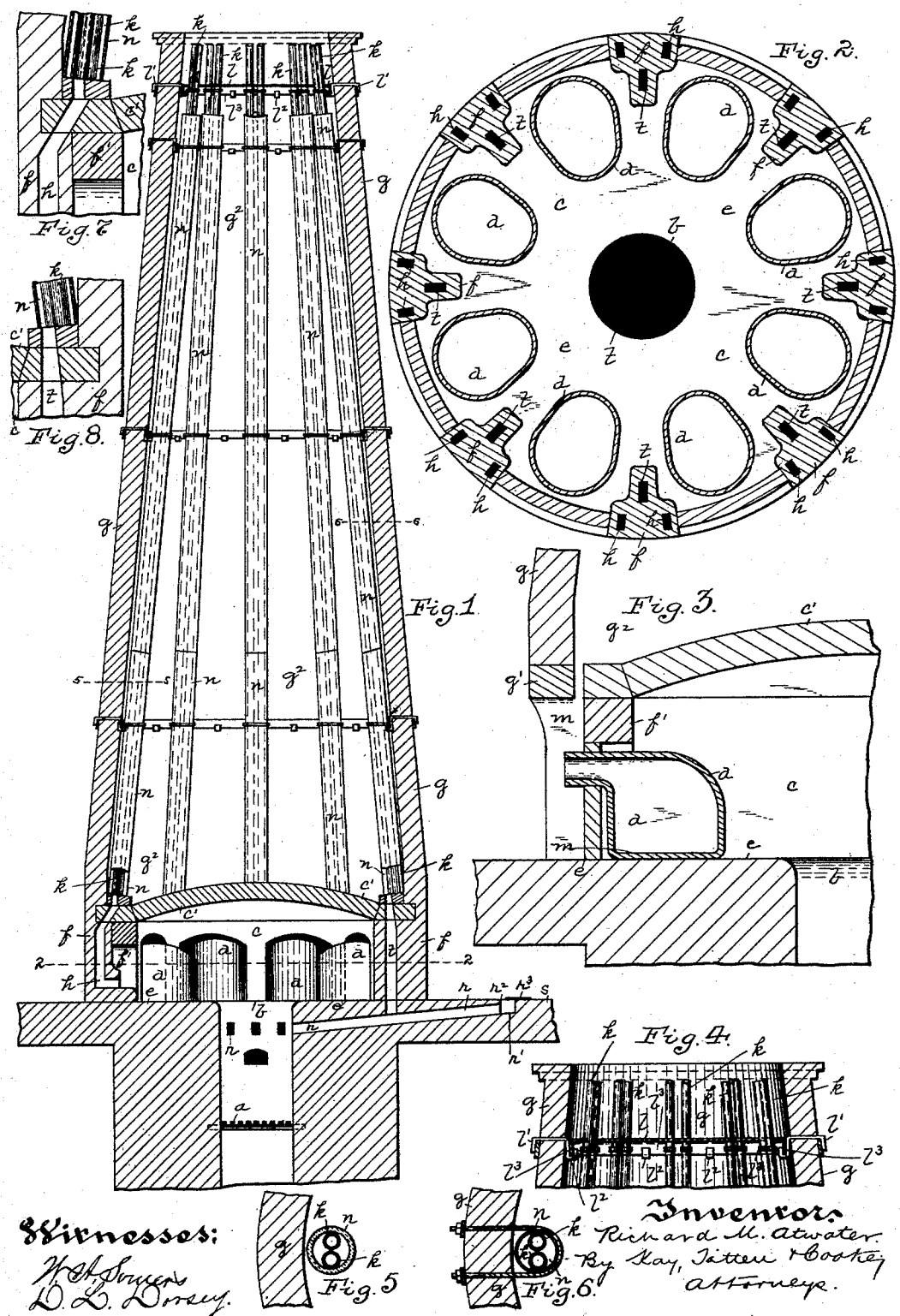
Witnesses:
W. H. Singer
D. L. Dorsey
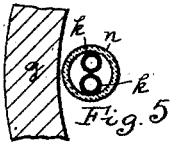
Inventor
Richard M. Atwater
By Kay, Totten & Cooke
Attorneys.

UNITED STATES PATENT OFFICE.

RICHARD M. ATWATER, OF PITTSBURG, PENNSYLVANIA.

GLASS-FURNACE.

SPECIFICATION forming part of Letters Patent No. 485,340, dated November 1, 1892.

Application filed June 28, 1892. Serial No. 438,309. (No model.)

*To all whom it may concern:*

Be it known that I, RICHARD M. ATWATER, a resident of Pittsburg, in the county of Allegheny and State of Pennsylvania, have invented a new and useful Improvement in Glass-Furnaces; and I do hereby declare the following to be a full, clear, and exact description thereof.

My invention relates to furnaces for heating and melting glass, being applicable more particularly to pot-furnaces, though the arrangement may also be employed in the heating of air in tank-furnaces operating on the recuperative principle. The usual custom in such furnaces is to provide for the passage of the flame and heat generated either from the gas or solid fuel around the body of the pot and into flues leading through the side walls above the crown of the furnace and into the stack, the flues in pot-furnaces leading from the furnace-chamber close to the stand or bed thereof, on which the pots rest, and so drawing the flame around the bodies of the pots and providing escape for the waste gases above the crown. For the purpose of glass-melting a high heat is required, which is confined within the furnace-chamber and below the crown, which radiates and reflects the heat down upon the pots, and it is evident that the waste products pass from this chamber at a very high heat.

The object of the present invention is to utilize such heat and in that way to provide a supply of highly-heated air to feed to the gases in the eye or entrance-flue of the furnace, so as to generate a much-higher heat in proportion to the fuel employed, and by means of the heated air to carry back into the furnace-chamber a large proportion of the heat which has heretofore been lost.

To these ends my invention consists, generally stated, in a glass-furnace having flues leading through the side walls in the furnace-chamber and extending for a considerable distance above the crown thereof and surrounding air-heating flues inclosing one or more of such waste-gas flues, through which the air is caused to pass, so as to absorb the heat from the escaping waste products, and a flue leading from said air-flue into said furnace-chamber or its entrance-flue, so as to support the combustion of the gases entering the furnace-chamber.

It also consists in providing the furnace with a mantel or transverse wall or plate extending across the top of the stack or chimney thereof, near the top of said stack, through which the flues carrying the waste products pass, so as to give escape to said products, and providing air-entrances at the base of the stack, so that the air is brought into contact with the top surface of the crown and rise within the stack, being heated in its upward course, and it is then caused to pass downward through the air-heating flues above described, so as to absorb the heat from the waste-product flues inclosed therein.

It also consists in certain other improvements in the construction of furnaces, which will be hereinafter more particularly set forth and claimed.

To enable others skilled in the art to make and use my invention, I will describe the same more fully, referring to the accompanying drawings, in which—

Figure 1 is a longitudinal section of a glass-melting furnace embodying my invention for the melting of glass in pots. Fig. 2 is an enlarged section thereof on the line 2 2, Fig. 1. Fig. 3 is an enlarged detail view showing a vertical section of a pot within the furnace-chamber. Fig. 4 is an enlarged section of the top of the stack or chimney. Fig. 5 is a section on the line 5 5, Fig. 1. Fig. 6 is a section on the line 6 6, Fig. 1; and Figs. 7 and 8 are enlarged detail sections showing the different flues.

Like letters of reference indicate like parts in each.

In said furnace I have illustrated an ordinary grate, as at $a$, below the eye $b$ of the furnace, which is illustrated as opening centrally within the furnace-chamber $c$, which has the crown $c'$, the chamber containing any suitable number of pots $d$, which rest upon the stand or floor $e$ of the furnace-chamber. The crown of the furnace is supported on pillars $f$, which rise to a suitable height and are connected by the arches $f'$, and the stack $g$ is also supported on the outer portions of said pillars $f$, from which separate arches $g'$ extend over, so as to form the base from which the stack-walls rise, the stack-walls being preferably carried up, so as to gradually approach each other and form the ordinary tapering stack of the furnace, though any suitable form of stack or chimney may be employed, it only being necessary that the stack shall provide room for the arrangement of the waste-gas flues and the air-heating flues, as hereinafter described. The waste-gas flues $h$ are arranged in the same way as usually employed in these furnaces, leading from the furnace-chamber $c$, near the base thereof, through the pillars $f$ and above the crown $c'$. Instead of simply opening into the chamber $g^2$ of the stack, so that such waste gases are unconfined and can rise through such stack-chamber, I carry the flues upwardly, as at $k$, such flue extensions $k$ being either formed of brickwork or of suitable tubes—such as fire-clay tubes or tiling—and the upper parts of such flue extensions, where the waste products have lost a considerable portion of their heat, can be formed of suitable iron tubes, or the tubes may be made of metal with a clay or refractory lining. These flue extensions $k$ are carried up to or near to the top of the stack and pass through what I term the "mantel" $l$, which is simply a cross wall or plate secured in suitable way within the stack or chamber and closing the upper part of the stack, as shown. The mantel $l$ is shown as formed of plate metal and is secured within the stack by means of anchor-bars $l'$, which extend through the walls and are provided with the hooks $l^2$, which engage with suitable lips or braces $l^3$, extending down from the body of the mantel. It will thus be seen that instead of employing separate mantels between the arches $f'$, extending between the pillars $f$ and the arches $g'$, supporting the stack, as is the usual custom, I leave this space open, so providing for an entrance of air into the base of the stack, which then becomes an air-heating chamber instead of a mere flue for carrying off the waste products. If desired, however, such spaces $m$ may be closed and any other suitable air-entrance employed, though in the ordinary furnace construction the maintenance of such mantels causes considerable trouble, as the breastwork between the pillars is necessarily removed in changing the pots, and such mantels are therefore often disturbed, while by simply employing such spaces $m$ as air-entrances I obtain the further advantage of forming a draft upwardly around the mouth of each pot and carrying off the air which is necessarily heated by radiation from the pot and the walls inclosing the same, so always providing a current of cool air rising at the pot-entrance, which renders it much cooler and more comfortable for the workmen, while the heat so radiated from the pot and walls is utilized in heating the air employed for combustion. It will be seen that in each pillar there are two waste-product flues $h$, which are carried as far as possible around toward the front of the furnace-chamber, so as to draw the heat around the body of the pot, and I may either unite these two flues at the top or carry them as separate flue extensions. Surrounding such flue extension or extensions $k$ is the downtake or heating flues $n$, which are made either of suitable tiling or of suitable metal tubing, or both, as may be found most desirable, or in some cases may be built up of brickwork, such air-heating flues extending up and opening near the mantel, so that air passing into the stack-chamber $g^2$ will rise through the same and then pass into the air-heating flues $n$, descending through the same.

To carry the heated air past the furnace-chamber $c$, I form in each pillar $f$ the downtake flue or passage $t$, which leads into the flue or passage $r$, extending through the foundation or bed of the furnace below the stand into the eye $b$, so as to introduce the heated air into such eye, the entrance ports or passage $r$ being illustrated as entering radially, though they may of course be carried into the eye semi-tangentially, as may be found desirable, for the proper intermingling of the air with the gas or flame rising from the furnace or introduced into the eye. It will be noticed that the downtake-passages $t$ are formed in the pillars in the portion thereof extending into the furnace-chamber $c$, where they are exposed to the high heat of the furnace, such portion of the pillars being liable to burn out in the ordinary gas-furnace, and the air passing through such downtake-passages is thus subjected to practically the high heat of the furnace, while at the same time it aids in cooling such portions of the pillars and extends the life of the same. I also prefer to carry the passages $r$ at a slight incline upwardly to the surrounding floor $s$ of the glass-house, the extensions $r'$ opening through said floor at the points $r^2$, where they are closed by suitable plates or dampers $r^3$, the passages $r$ therefore also acting for the introduction of cold air into the eye of the furnace, as may be found desirable, according to the heating or manipulation of the same. Such flues $r$ are of course preferably arranged in the manner described when the invention is employed in the ordinary circular pot-furnace; but in tank or other like furnace the flues may lead to any other points where it is desired to enter the heated air so as to support combustion.

It is of course to be understood that the improvements above described may be employed in a stack or chimney which is not arranged directly over the furnace, and that such are included within my invention.

When the furnace embodying my invention is employed, the gaseous or other fuel is introduced in the proper way, either from a suitable gas-producer, where manufactured gas is employed, or from suitable pipes where natural gas is employed or solid fuel is introduced upon the grate $a$ where such simple form of furnace is employed, and the flame and gases rise from the same, pass through the eye, and combine with the air entering through the passages or ports $r$, raising the furnace-chamber $c$ to a high heat, the waste products and flame being drawn around the pots and passing through the flues $h$ and rising thus into the flue extensions $k$, through which such waste products pass upwardly until the flue extensions open above the mantel $l$. In the meantime the air enters at the base of the stack-chamber $g^2$, such as through the openings $m$, above described, the air in such case being first heated as it passes along the walls inclosing the pots, and then when it enters the stack-chamber circulating over the crown $c'$ in the furnace-chamber, and then rising through the stack-chamber until it reaches the top of the air-heating flues $n$, when it enters the same, and in passing down through such air-heating flues absorbs the heat through the walls of the waste-product flue extensions $k$, the air then passing downwardly into and through the flues or passages $t$ in the pillars $f$ to the entrance-ports $r$, and entering through the same into the eye of the furnace, so providing highly-heated air to aid in the combustion of the gases, &c., and carrying back into the furnace-chamber the heat absorbed from the waste gases as they pass through the extensions $k$ of the waste-gas flues and through the walls of the pillars $f$. It will be evident that the lower part of the extensions $k$ and of the air-heated flues $n$ must be raised to a higher heat than the upper parts thereof, and that a portion of that heat will be radiated through the walls of the air-heating flues $n$, and the air rising through the stack-chamber will be heated thereby, so that practically all the heat from the waste products is thus utilized for heating the air, the furnace thus giving a recuperative action by a very simple construction and one which adds but little to the cost of the furnace. At the same time the furnace can be controlled in the ordinary way, and when necessary cold air may be introduced into the furnace directly through any one of the inlet-ports $r$, the cover plate or damper $r^3$ being removed from the opening $r^2$ and the air passing down the rearward extension $r'$ of said port and thence into the furnace-chamber. For such operations the downtake-passage $t$ may also be controlled by a damper, so as to cut off any hot air or reduce the amount flowing through the same. The furnace is thus brought practically under the control of the operator.

As I am enabled to employ highly-heated air in supporting combustion, a much higher heat can be generated within the furnace, leading to a more rapid melting and fining of the glass, and at the same time the crown and the inner portions of the pillars of the furnace-chamber are kept cool through the medium of air which is being heated for use. I thus obtain the advantages of more rapid work in moderate-sized pots and provide for the melting, fining, and working out of the glass within the twenty-four hours' time, so as to bring the pots ready for use once each day. I also obtain a greater life to the furnace, even though a higher heat is employed, and an economy of fuel, as with the highly-heated air obtained through the recuperative system above described the furnace will not require such a large amount of fuel to retain it at the desired heat. The furnace has also the still further advantage of maintaining a fresh current of air traveling up over the surface of the wall inclosing the pot and so protecting the workmen from intense heat.

What I claim as my invention, and desire to secure by Letters Patent, is—

1. A glass-melting furnace having a furnace-chamber, a crown extending over the same, a stack extending above said crown, a series of waste-product flues leading from the furnace-chamber and extending upwardly through the stack-chamber without communicating with the stack-chamber, and an air-entrance and air-discharge communicating with the stack-chamber, substantially as and for the purposes set forth.

2. A glass-melting furnace having a furnace-chamber, a crown over the same, a stack extending above the crown, waste-product flues leading from the furnace-chamber and extending upwardly through the stack-chamber, a mantel in the upper portion of the stack, through which such waste-product flues extend, and an air-entrance and air-discharge communicating with the stack-chamber, substantially as and for the purposes set forth.

3. A glass-melting furnace having a furnace-chamber, a crown extending over the same, a stack extending up from the furnace, waste-product flues extending upwardly through the stack-chamber, and downtake air-heating flues inclosing one or more of such waste-product flues, substantially as and for the purposes set forth.

4. A glass-melting furnace having a furnace-chamber, a crown extending over the same, a stack extending up from said furnace and having a mantel or cross-wall in its upper portion, waste-product flues leading from the furnace-chamber through the stack-chamber and said mantel and opening above the mantel, an air-entrance communicating with the stack-chamber, and downtake or heating flues, each inclosing one or more waste-product flues, substantially as and for the purposes set forth.

5. A glass-melting furnace having a furnace-chamber, a series of pillars supporting the crown and stack, downtake air-heating flues formed in such pillars, and flues leading therefrom to the fire-chamber, substantially as and for the purposes set forth.

6. A glass-melting furnace having a furnace-chamber, a series of pillars supporting the crown and stack, downtake air-heating flues formed in such pillars, and uptake waste-product flues formed in the same, substantially as and for the purposes set forth.

7. A glass-melting furnace having a furnace-chamber, pillars supporting the crown and stack and having waste-product flues and downtake air-heating flues therein, extensions of the waste-product flues formed within the stack, and downtake air-flues surrounding such extensions and communicating with the downtake air-heating flues in the pillars, substantially as and for the purposes set forth.

8. A glass-melting furnace having a furnace-chamber, pillars supporting the crown above the same, downtake air-heating flues extending through said pillars, and flues leading therefrom to the entrance-port of the furnace, said entrance-flues having, also, extensions leading directly to and communicating with the outside of the furnace, substantially as and for the purposes set forth.

9. A glass-melting furnace having a furnace-chamber, pillars surrounding the same, supporting the crown and stack, an air port or passage between the inner and outer arches from said pillars, a stack having a mantel at the upper end thereof, waste-product flues leading from the furnace-chamber and having extensions through the stack-chamber and through the mantel, and downtake air-heating flues, each surrounding one or more of such extension-flues and having their inlets within the stack-chamber and near said mantel, substantially as and for the purposes set forth.

In testimony whereof I, the said RICHARD M. ATWATER, have hereunto set my hand.

RICHARD M. ATWATER.

Witnesses:
  J. N. COOKE,
  ROBT. D. TOTTEN.